Aug. 13, 1929.　　　W. W. HOOK　　　1,724,089

FOCUSING HOOD FOR CAMERAS

Filed Jan. 30, 1928

Inventor
Walter W. Hook.
By Lyon & Lyon
Attorneys

Patented Aug. 13, 1929.

1,724,089

UNITED STATES PATENT OFFICE.

WALTER W. HOOK, OF LOS ANGELES, CALIFORNIA.

FOCUSING HOOD FOR CAMERAS.

Application filed January 30, 1928. Serial No. 250,502.

This invention relates to focusing hoods for use with cameras and, more especially, to that type of focusing hood that can be readily attached to and detached from the camera back.

An important object of the invention is to provide a construction of focusing hood that can be substituted to good advantage in place of the ordinarily employed focusing cloth, which is a black cloth that the photographer throws over the rear end of the camera and over his head while he views the image projected on the ground glass by the lens of the camera. Focusing cloths are difficult to manage because they are simply loose pieces of material that must be held in place by the photographer.

Another object of the invention is to provide a construction that can be attached in different positions to the camera back, so that the photographer can view the image by looking downwardly into the hood, when it is possible to place the camera a little below the level of the eye of the photographer, and so that the photographer can view the image by looking horizontally into the hood, when it becomes necessary to place the camera at such elevation as would make it impossible for the photographer to look downwardly into the hood unless he stood upon a platform that would elevate him sufficiently for that purpose.

Another important object of the invention is to provide a construction that will readily admit of the hood being attached to the ground glass holder in the different positions that the said holder occupies. It will be readily understood, by those skilled in this art, that the ground glass holder is attachable to the camera box in two positions, so that the plate holder may be slid into place between the box and the ground glass holder, so as to hold the plate holder with the long way of the plate vertical, or to hold the plate holder with the long way of the plate horizontal. The purpose of this is to enable the photographer to accommodate the plate to the area that is to be photographed.

From the foregoing it will be readily understood that my construction enables me to position the hood in three different positions, according to circumstances.

Another important object is to provide a simple construction that will accomplish the foregoing.

Other objects and advantages will appear in the subjoined detailed description.

The accompanying drawings illustrate the invention.

Figure 1:
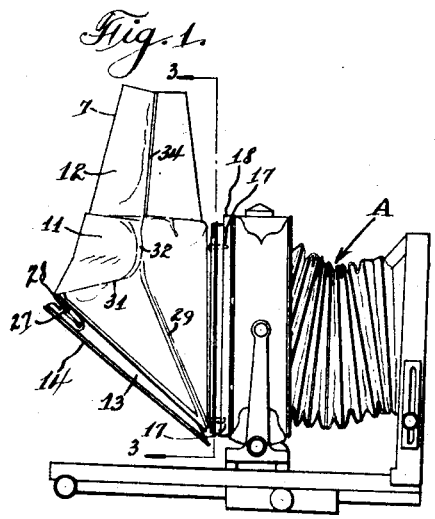
Figure 1 is a side elevation of a focusing hood constructed in accordance with the provisions of this invention, the same being shown attached to a camera.

Referring to the drawings, there is provided a tubular member comprising four walls indicated at 7, 8, 9 and 10. These walls are made of a suitable material, or combination of materials, so as to be rigid in portions and foldable in other portions. The walls form a rigid intermediate section 11, a collapsible rear section 12, connected to one end of the section 11, and a collapsible bellows section 13 connected to the other end of the intermediate section 11.

Secured to the free end of the bellows section 13 is a square plate 14, which may be of metal or other suitable material. The plate 14 is provided with a square opening 15.

Figure 2:
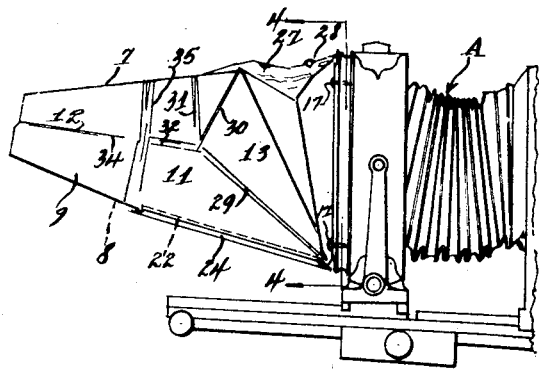
Figure 2 is a side elevation of the focusing hood attached in a different position than in Figure 1 to the camera, a portion of the camera being broken away.

The plate 14 is adapted to slidably engage a support 16 which is secured by screws 17, or their equivalents, to the ground glass carrier 18 of the camera, which is indicated in general at A, as shown in Figure 2. The support 16 is in the form of a plate which cooperates with the plate 14 to detachably connect the bellows section 13 with the ground glass carrier. The plate 16 is provided centrally with an orifice 19, so as to permit light rays to pass through the ground glass of the camera, not shown, into the focusing hood. The ground glass carrier, as is customary, is detachably mounted in a manner well understood in the camera art so that it can be attached with its long dimension either vertical or horizontal in order that the rectangular area of the image on the ground glass may be seen by the photographer with its long dimension either vertical or horizontal. In this particular instance, the connection between the plates 14, 16 is constructed by having the marginal portions of the plate 16 bent rearwardly and inwardly to form a pair of opposed flanges 20, 21.

Figure 3:
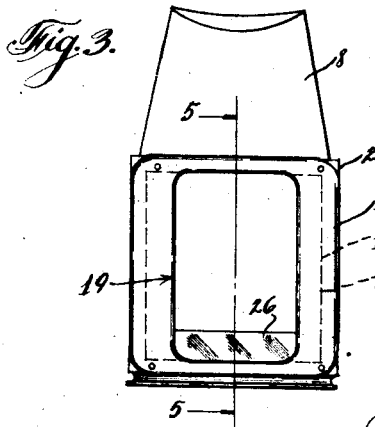
Figure 3 is an elevation on the line indicated by 3—3, Figure 1.
Figure 4:
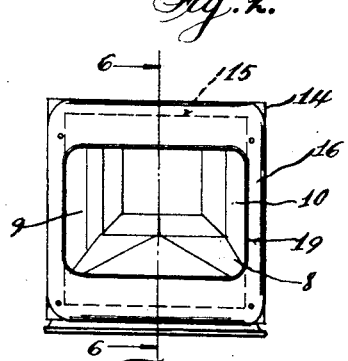
Figure 4 is an elevation on the line indicated by 4—4, Figure 2.
Figure 7:
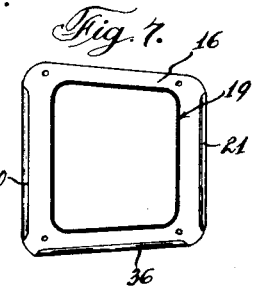
Figure 7 is a perspective view looking at the rear face of one of the attaching plates.

The wall 8 is provided with an opening 22 that registers with the intermediate section 11, and registering with the opening 22 is a square opening 23 in a plate 24, which is secured to the section 11 and which is constructed of sheet metal or other suitable material. The plate 24 is square and, like the plate 14, is adapted to be slid between the flanges 20, 21 when the hood is positioned as in Figure 1. The reason for making the plates 14, 24 square is so that they may be engaged with the flanges 20, 21 with the tubular member remaining in the positions shown in Figures 1 and 2, whether said flanges be horizontal or vertical, it being readily understood that turning of the ground glass carrier into different positions, to accommodate the plate holder so that the long way of the plate will be vertical or horizontal, will affect the position of the flanges 20, 21. In other words, changing the position of the ground glass by 90° of angular measurement will shift the flanges 20, 21 from horizontal, as in Figure 5, to vertical and, since the plates 14, 24 are square, it is clear that either plate may be slid between the flanges 20, 21, whether said plate be turned to the position shown in Figure 3, or to another position 90° of angular measurement from that shown in Figure 3. This enables the tubular member, when attached by the plates 16, 24, as in Figure 1, to be always attached to the camera with the section 12 pointing upwardly, as in Figure 1, whether the ground glass carrier be turned to a position to take the plate holder vertical or horizontal; and also enables the tubular member, when attached by the plates 14, 16, as in Figure 2, to be always attached with the hinge 241 of the bellows positioned at the bottom irrespective of which position the ground glass carrier is turned to.

Figure 6:
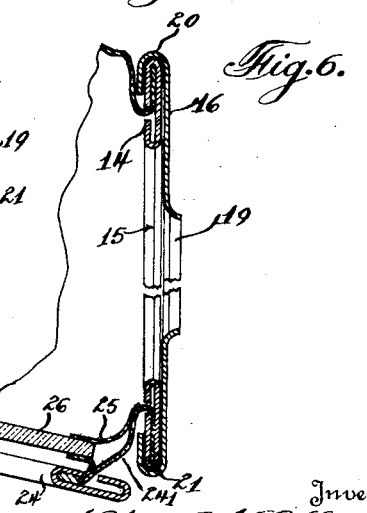
Figure 6 is a broken vertical section on the line indicated by 6—6, Figure 4.

Hingedly connected at 25 to the plates 14, 24 is a mirror 26, which may be swung into different positions, according to the position of the hood on the camera. In Figure 6 the mirror 26 is shown supported by the wall 8 in position to close the openings 22, 23, so that, if the photographer places his eyes at the rear end of the section 12, in Figure 2, he will see the projected image upon the ground glass, not shown, of the camera. In this instance, the image will be seen inverted on the ground glass.

Figure 5:
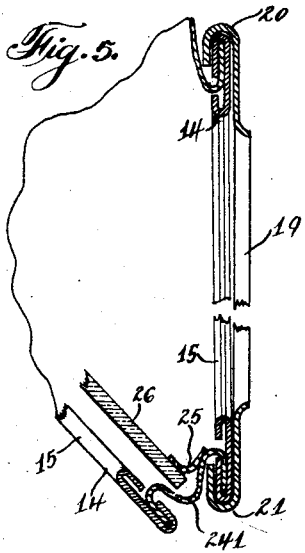
Figure 5 is a broken vertical section on the line indicated by 5—5, Figure 3.

When, as in Figure 1, the plate 24 is attached to the plate 16, the mirror 26 may be positioned as in Figure 5, so as to uncover the openings 22, 23 and close the opening 15. Preferably, the mirror 26 will be caused to assume an angle of approximately 45° to the horizontal and, for this purpose, I provide a means to hold the bellows section 13 folded, as in Figure 1. This means, in this instance, comprises snap or glove fastener members 27, 28, which will be disengaged when the hood is positioned, as in Figure 2, so that the hood may be supported in substantially horizontal alignment with the camera. When the hood is in the position shown in Figure 1, the fastener members 27, 28 will be engaged, so as to hold the plate 14 at an angle of approximately 45° to the horizontal, thus holding the mirror 26 at approximately the same angle.

The operation of the invention is as follows: Assuming, for example, that it is advisable for the photographer to view the image on the ground glass of the camera directly, as he would with the ordinary focusing cloth, the plate 14 will be attached to the plate 16, so as to position the parts as shown in Figure 2, and the photographer will place his eyes at the rear end of the section 12 and view the image on the ground glass, in the customary manner.

Assuming that the photographer is positioned with reference to the camera so that his eyes will be somewhat above the level of the camera as when, for example, the camera is held by the photographer in front of his body, the plate 24 will be attached to the plate 16, so as to position the parts as in Figure 1, and the photographer will then look through the upper end of the section 12 and will view the image on the mirror 26 which receives the image from the ground glass of the camera. In this instance the image on the mirror 26 will be normal or, in other words, will not be reversed, as it appears on the ground glass. This, of course, is quite an advantage when using the invention in this manner.

It will be readily understood that, whether the ground glass holder be attached to the camera box so as to position the flanges 20, 21 horizontally or vertically, the hood may be attached to the plate 16 with the section 12 pointing upwardly, as in Figure 1. Thus, the photographer can view the image by looking downwardly into the hood, whether the plate is to be inserted in the camera with its long dimension vertical or horizontal.

The hood can be folded, when not in use, and to permit of its folding the section 11 has folding joints 29, 30, 31, 32; a folding joint 33 connects the section 11 with the bellows section; the section 12 is provided with a folding joint 34; and a folding joint 35 connects the sections 11, 12. When the hood is attached, as in Figure 1, to fold it, the plate 14 is swung toward the plate 24 and then the section 12 is folded backward upon the plate 14 or forwardly over the camera box. When the hood is attached, as in Figure 2, to fold it, the plate 24 is swung toward the plate 14 and then the section 12 is folded as just described.

In some instances, I may provide a stop on the plate 16 to prevent sliding of the plates 14, 24 in one direction beyond a predetermined position wherein the edges of the plates 16, 14 or 16, 24, as the case may be, are approximately flush and for that reason a third flange 36 is provided on the plate 16 along the margin of the plate 16 that extends between the flanges 20, 21 so that one edge of the plate 14 or 24 will stop against the flange 36 when said plate 14 or 24 is slid into place between the flanges 20, 21.

I claim:

1. A focusing hood for cameras comprising a tubular member provided with a bellows section and with an opening in one of its walls, a mirror hingedly mounted in the tubular member and adapted to swing toward and from said opening, and means to connect either the bellows section or said wall to the ground glass carrier of a camera.

2. A focusing hood for cameras comprising a tubular member provided with a bellows section and with an opening in one of its walls, a mirror hingedly mounted in the tubular member and adapted to swing toward and from said opening, means to connect either the bellows section or said wall to the ground glass carrier of a camera, and fastener members on the bellows engageable to hold the bellows folded.

3. A focusing hood for cameras comprising a tubular member provided with disengageable cooperating means to attach said tubular member to the ground glass carrier of a camera, one of the cooperating means adapted to be fixed to the ground glass carrier and the other of said means engageable with the first mentioned means when the tubular member is in one position and the ground glass carrier is either in a position to receive a plate holder vertically or in a position to receive the plate holder horizontally.

4. A focusing hood for cameras comprising a tubular member provided with an opening in one of its walls, a mirror hingedly mounted in the tubular member and adapted to swing toward and from said opening, and means to connect either one end of the tubular member or said wall to the ground glass carrier of a camera.

5. A focusing hood for cameras comprising a tubular member formed in sections, there being folding joints connecting the sections and one of said sections constituting a bellows section, a means to connect the bellows section to the ground glass carrier of a camera, the other sections provided with folding joints.

6. A focusing hood for cameras comprising a tubular member formed in sections, there being folding joints connecting the sections and one of said sections constituting a bellows section, a means to connect the bellows section to the ground glass carrier of a camera, the other sections provided with folding joints, one of the sections provided with an opening, and a mirror mounted in the tubular member at approximately an angle of 45° to the plane of said opening.

7. A focusing hood for cameras comprising a tubular member provided with disengageable cooperating means to attach said tubular member to the ground glass carrier of a camera, one of the cooperating means including a member adapted to be fixed to the ground glass carrier and the other of said means engageable with the first mentioned means when the tubular member is in one position and the ground glass carrier is either in a position to receive a plate holder vertically or in a position to receive the plate holder horizontally, the tubular member provided with an opening in one of its walls, a mirror hingedly mounted in the tubular member and adapted to swing into position to close the opening or to close one end of the tubular member, and a means adjacent to said opening adapted to cooperate with the member fixed to the ground glass carrier to support the tubular member with said opening turned toward the ground glass carrier.

8. A focusing hood for cameras comprising a tubular member provided at one end with a bellows section and with an opening in one of its side walls, a plate having an opening and attachable to the ground glass carrier of a camera, cooperating means on the bellows section and the plate to releasably attach said section to the plate, means on said side wall adapted to cooperate with the plate to support the tubular member in position with the opening in its side wall registering with the opening in the plate, and a mirror hingedly mounted in the tubular member and adapted to be swung over the opening in said side wall when the bellows is connected with the carrier, said mirror adapted to be swung into position to close the end of the bellows when said side wall is connected with the carrier.

Signed at Los Angeles, California, this 20 day of January, 1928.

WALTER W. HOOK.